G. Gilbert,
Dressing Staves.
Nº 6,352.  Patented Apr. 17, 1849.
Fig. 1.
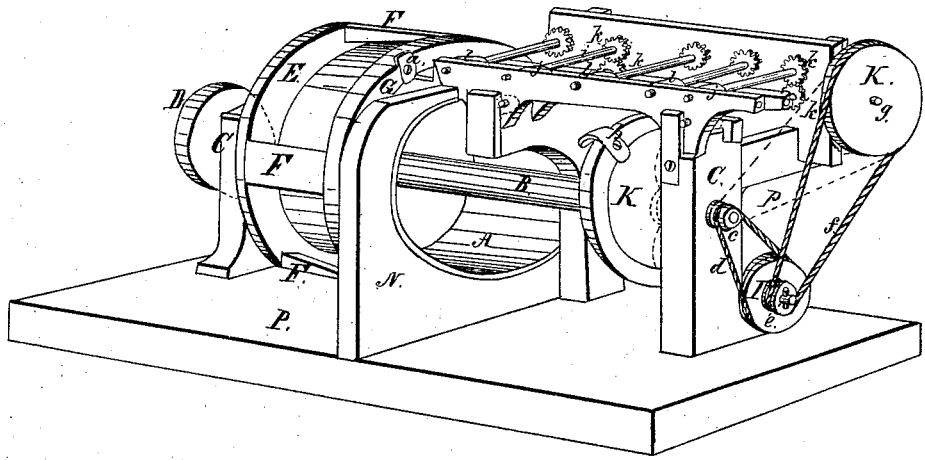
Fig. 2.
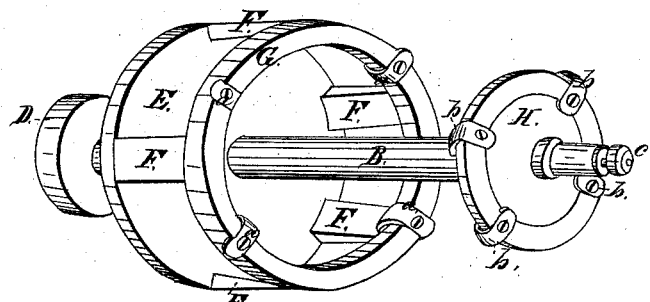
Fig. 3.
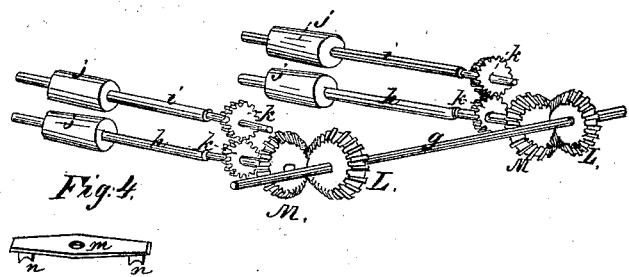
Fig. 4.

UNITED STATES PATENT OFFICE.

GEORGE GILBERT, OF NEW HAVEN, CONNECTICUT.

MACHINERY FOR DRESSING STAVES.

Specification of Letters Patent No. 6,352, dated April 17, 1849.

*To all whom it may concern:*

Be it known that I, GEORGE GILBERT, of the town and county of New Haven and State of Connecticut, have invented a new and useful Improvement in Machinery for Dressing Staves for Barrels, and other Casks; and I do hereby declare that the following is a full, clear, and exact description of the construction and operation of the same, reference being had to the accompanying drawings, which make a part of this specification, in which—

Figure 1, is a perspective view of the whole machine, as ready for use, Fig. 2, is a spective view of the two cutter wheels, and two pulley on or the arbor, to which they are attached. Fig. 3, is a perspective view of the bevel gearing which works the feed-in rollers, showing how it is connected with the said rollers. Fig. 4, is a perspective view of one kind of spring which may be used to press down the feeding rollers onto the rough material, or bolt, showing the plugs, or dowels, which bear on the journals of the arbors.

My improvement consist in so constructing the several parts of the machine that, by one continuous operation, the stave is fully dressed on both sides and thrown out of the machine; by having cutters attached to the periphery of a cutter wheel which revolves below the rough material, or bolt, and dresses the inner, or concave side of the stave; and cutters attached to the inner edge of a rim, or circle, which revolves outside of the rough material, or bolt, and dresses the outer, or convex side of the stave, both these cutter wheels being on the same arbor, or shaft, and, therefore, revolving in the same direction, and in the same time and the rough material, or bolt, being fed by geared feeding rollers, put in motion by beveled gearing on the outside of the frame, and the whole being put in motion by one main pulley and band, or any other suitable means, and one or two secondary bands to carry the feeding rollers.

I make the whole of the machine, (except the cutters,) of cast iron, or other suitable materials, of sufficient size for the largest size of staves that is used for casks, (or for any particular size, as may be deemed most convenient, in any case,) with a hollow cylinder, A, Fig. 1, somewhat greater in diameter than the length of the longest stave intended to be dressed, and its length also greater than the length of the stave, having the back end closed. This cylinder I secure permanent in its proper position in the frame, as seen at A, Fig. 1, by means of the frame work, N, Fig. 1, which with the bearings, C, C, Fig. 1, and the supporting stud, O, Fig. 1, are firmly attached to the platform or base P, Fig. 1. Through the central part of this cylinder, A, Fig. 1, I pass the arbor, or shaft, B, Figs. 1, and 2, of the two cutter wheels, E & H, Figs. 1 and 2. The shaft, or arbor, being sustained in appropriate bearings, C, C, Fig. 1, which support its whole length. On the end of this main arbor, or shaft, B, Figs. 1, and 2 back of the closed end of the cylinder, I place a pulley, D, Figs, 1 and 2. This pulley, by means of a band, drives the whole of the machinery. Or other gearing may be used. Between this pulley D, Figs. 1, and 2, and the closed end of the cylinder, A, Fig. 1, on the same arbor, or shaft, B, Figs. 1, and 2, I place a large wheel, E, Figs. 1, and 2, made solid, with spokes, or other open work, as may be deemed best in any case. This wheel, E, Figs. 1 and 2, must be larger in diameter than the cylinder, A, Fig. 1, and must have arms, F, F, F, Figs. 1, and 2, projecting over, and outside of the cylinder, as seen in Fig. 1, to sustain the rim, or circle, G, Figs. 1, and 2, to which the cutters, $a$, Fig. 1, and $a$, $a$, $a$, $a$, Fig. 2, are attached which dress the outer, or convex side of the stave.

I make the cutters of steel, of the gouge shape, as seen at $a$, Fig. 1, and $a$, $a$, $a$, $a$, Fig. 2, of suitable size, and attach them to the rim, or circle, G, Figs. 1, and 2, by means of screws, or otherwise, in such a position that the cutting edge projects toward the center of the circle formed by the rim, or circle as seen at $a$, Fig. 1 and $a$, $a$, $a$, $a$, Fig. 2, for the purpose of dressing the outer or convex side of the stave. On the same arbor, or shaft, B, Figs. 1, and 2, and beyond the open end of the cylinder, A, Fig. 1, I place the smaller cutter wheel, H, Figs. 1, and 2, with cutters, $b$, Fig. 4, $b$, $b$, $b$, $b$, Fig. 2, also of the gouge shape, and attached to the periphery of the wheel by screws, or otherwise, projecting from the center of the wheel, and beyond its periphery, as seen at $b$, $b$, $b$, $b$, Fig. 2, in a proper position to dress the inner, or concave, side of the stave, from the under side as represented in Fig. 1. On the other end of the same arbor, or shaft, B, Figs. 1, and 2, I make, or place, a small pulley, c, Figs. 1 and 2, from which a band, d, Fig. 1, passes around a large pulley, I, Fig. 1, below; attached to, or connected with this pulley I, Fig. 1, on the outer side, is another small pulley, e, Fig. 1, from which a band f, Fig. 1, passes upward and around another larger pulley, R, Fig. 1. Or the pulleys, I and e, Fig. 1, may be dispensed with, and a single band passes from the small pulley c, to the larger pulley, K, Fig. 1, as represented by the dotted lines, p, Fig. 1, as may be deemed most convenient.

On the arbor g, Figs. 1, and 3, of the pulley K, Fig. 1, I place two beveled toothed wheels, L, L, Fig. 3, which work into two similar beveled toothed wheels, M, M, Fig. 3, on the ends of the arbors, h, h, Fig. 3, of two of the feeding rollers, j, j, Fig. 3.

The two feeding rollers, j, j, Fig. 3, which are worked by these bevel-gear wheels, L, L, and M, M, have similar rollers, j', j', directly above them, with the arbors, i, i, of which they are geared, by means of small wheels, or pinions, k, k, and k, k, Figs. 1, and 3, so that the two pairs of rollers, j, j', and j, j', Fig. 3, are worked equally, and by the same power. I also add a sufficient number of friction rollers, l, l, l, Fig. 1, to press upon the upper side of the rough material, or bolt; and directly under these friction rollers I place rests, or cross bars, on a level with the lower feeding rollers, j, j, Fig. 3, to sustain the rough material steadily in its position as it is carried through the machine, during the operation of dressing. There must be one rest, or cross bar, and a friction roller over it, within the open end of the cylinder, and beyond the rim, or circle, G, Figs. 1, and 2, to sustain the bolt against the cutters on the rim or circle until it is fully depressed; these are not shown on the drawing, being concealed by the rim, or circle G, Fig. 1.

Should it be found to be more convenient or useful, to have more than two pairs of feeding rollers, they may be added by increasing the same gearing which is used for the two pairs to any desired extent. The feeding rollers j', j', Figs. 1, and 3, and the friction rollers, l, l, l, &c. are pressed down upon the rough material, or bolt, as it passes, by means of springs, m, m, m, Fig. 1, of the form seen in Figs. 4, (or spiral, or any other suitable spring may be used,) so as to keep the rough material, or bolt, in close contact with the lower feeding rollers, j, j, and the rest, or cross bars, and yet leave it sufficiently free to be carried by the feeding rollers through its whole length, and out into the cylinders. These springs press on the ends of small dowels, or plugs, as seen at n, n, Fig. 4, the lower ends of which rest on the journals of the arbors.

The rough material, or bolt, is placed between two side pieces, o, o, Fig. 1, to guide it in its proper direction, while it is being fed to the cutters, and carried through the machine by the action of the feeding rollers, j j and j', j', Figs. 1, and 3, working as before described.

While the rough material, or bolt, is thus passing through the machine, it passes over the cutters, b, Fig. 1, and b, b, b, b, Fig. 2, of the small cutter wheel, H, Figs. 1, and 2, which dress the inner or concave side of the stone; and under the cutters, a, Fig. 1, and a, a, a, a, Fig. 2, of the large cutter wheel, rim, or circle, E, Figs. 1, and 2, which dress the outer, or convex side of the stave; and when thus dressed on both sides, it falls down to the bottom of the cylinder, A, Fig. 1, from which the staves may be removed when necessary. Or, the lower side of the cylinder, A, Fig. 1, on the inside, may be so constructed as to afford a proper pitch, so that when the stave falls, (after being fully dressed,) it will by its own weight fall out of the cylinders, should this form be preferred in any case.

The cutters may be so adjusted, to the cutter wheels, as to leave the stave of any desired thickness; and the wheels may be made of such diameter as to suit the curve of the cask for which they are intended.

The advantages of my improvement, over all other methods now used, consist in making the large cutter wheel, which dresses the outer or convex side of the stave, in such a manner that the rim, or circle, to which the cutters are attached may be firmly supported by the arms connecting it with the wheel back of the cylinder; while the cylinder being placed within the circle described by the arms and rim, prevent the staves, when dressed from falling against and clogging the wheel. And in placing a rest, and a roller within the length of the cylinder, beyond the rim to steady and support the stave until it is fully dressed; and in placing the smaller cutter wheel at such distance from the open end of the cylinder as to allow the staves to be readily removed without stopping the machine; and in so arranging the feeding rollers, with their gearing, that the whole machine may be driven by one pulley and band.

I am aware that machinery has been made by means of which both sides of the staves have been dressed at the same time. And, also, that feeding rollers and friction rollers have long been used for feeding the material to the cutters. And that revolving cutters have long been used. I, therefore claim none of these, as such, as my invention, but What I do claim as my invention, and desire to secure by Letters Patent, is—

So constructing the whole machine that the rim, or circle, which carries the cutters for dressing the outer, or convex, side of the stave, may be firmly attached to, and sustained by, strong arms connected with a substantial wheel on the same arbor, axle, or shaft, as the other cutter wheel, so that the two cutter wheels may revolve in the same direction, and in the same time, and so that the cylinder, within the arms that sustain this rim, or circle, (having the back end closed,) may receive the staves as they fall, (after being fully dressed,) and prevent them from clogging the wheels; and in placing the other cutter wheel at such a distance from the open end of the cylinder as to allow convenient room to remove the staves at pleasure; the wheel constructed, combined, and arranged, substantially, as herein described.

GEO. GILBERT.

Witnesses:
JESSE KNEVAL,
R. FITZGERALD.